United States Patent
Porter, Jr.

[15] 3,671,457

[45] June 20, 1972

[54] METHOD OF MAKING STABLE, LOW VISCOSITY WAX-IN-WATER EMULSIONS

[72] Inventor: Warren K. Porter, Jr., Richland Township, Allegheny County, Pa.

[73] Assignee: Gulf Research of Development Company, Pittsburgh, Pa.

[22] Filed: May 28, 1970

[21] Appl. No.: 41,590

[52] U.S. Cl..........................................252/311.5, 260/613
[51] Int. Cl. .......................................................B01j 13/00
[58] Field of Search...............252/311.5; 106/270, 245, 224; 260/613

[56] References Cited

UNITED STATES PATENTS 2,213,477  9/1940  Steindorff et al......................260/613
2,684,948  7/1954  Cross..................................252/311.5

*Primary Examiner*—John D. Welsh
*Attorney*—Meyer Neishloss, Deane E. Keith and Donald L. Rose

[57] ABSTRACT

There is described a novel method for producing low viscosity water emulsions of high solids content from waxes using an alkylphenol ethoxylate emulsifying agent having at least 30 carbon atoms in the alkyl group. The emulsion is prepared by mixing the constituents at an elevated temperature, then cooling the emulsion below the melting point of the wax and finally reheating the emulsion to the melting point of the wax or higher to substantially lower the room temperature viscosity of the emulsion.

10 Claims, No Drawings

METHOD OF MAKING STABLE, LOW VISCOSITY WAX-IN-WATER EMULSIONS

This invention relates to improved aqueous emulsions of waxes as well as methods of producing the same.

Hydrophobic waxes are commonly employed in aqueous emulsions to impart a degree of water-repellency and dimensional stability to wood particle board. These aqueous emulsions may also be employed as coatings in the manufacture of paper and textiles and as lubricants in the weaving of yarns. Also they are used in the finishing of aluminum and brass sheets and the mulching of soil.

It has been proposed that such wax-in-water emulsions be prepared using an alkylphenol ethoxylate having 30 or more carbon atoms in the alkyl group. Although this class of emulsifying agents produces excellent, stable wax-in-water emulsions, it has been discovered that the viscosity of the emulsion is too high for convenient handling and application when the solids content is high. However, a high solids content is desirable to reduce transportation and shipping costs and in many instances to insure that the desired quantity of wax is applied to the substrate.

I have discovered as my invention a process for making a low room temperature viscosity, high solids content water emulsion of a wax and an alkylphenol ethoxylate having at least 30 carbon atoms in the alkyl group as the emulsifier. In my process the wax, the emulsifier and the water are mixed, preferably by stirring or other suitable mild agitation, at an elevated temperature, preferably at the temperature at which the wax and emulsifier are molten or somewhat higher. The mixture is then cooled below the melting point of the wax and emulsifier to form a thick, viscous and creamy emulsion. This viscous emulsion is then reheated to the melting point of the solid wax-emulsifier phase or higher and then cooled to room temperature. The final product is a fluid emulsion of substantially lowered room temperature viscosity when compared with the room temperature viscosity of the emulsion prior to reheating.

As a result of the process of this invention, wax emulsions of high solids content can readily be produced and shipped over long distances without transporting an uneconomical amount of water. Furthermore, since the emulsion has a low room temperature viscosity, it can easily be pumped into and out of the shipping containers as well as at the point of use, particularly when spray application is desired. Since the emulsion contains a high solids content it can be applied directly or easily diluted with water to any desired solids content.

The emulsion is made from any suitable wax such as a paraffin wax or an alpha-olefin wax. Paraffin waxes generally have a melting point in the range of about 50° to 68° C. while alpha-olefin waxes, that is an alpha-olefin or mixtures of alpha-olefins having at least 30 carbon atoms, have a melting point of about 75° to 80° C. Since the alkylphenol ethoxylate emulsifier with at least 30 carbon atoms in the alkyl group has a melting point within the range of about 70° to 80° C., it is necessary to prepare the emulsion by mixing the wax, emulsifier and water at a temperature of at least about 80° C. or somewhat higher. In as much as water boils at 100° C., this is the preferred upper range for preparing the emulsion, however, satisfactory emulsions can be prepared at higher temperatures in an autoclave without any added advantage. These emulsions are conveniently prepared at a temperature between about 90° to 100° C. using a steam heated vessel.

As pointed out, emulsions of high solids content and low room temperature viscosity can readily be produced by my process. I have discovered that a solids content as high as about 50 percent or higher can be prepared in accordance with this invention. When the solids content is below about 15 percent, the initial room temperature viscosity is low enough for direct use, there-fore, this process is intended for use with emulsions having a solids content of about 15 to about 50 percent.

In making these emulsions it is generally desired to use no more than a sufficient amount of the emulsifier required to produce a good, stable emulsion since the emulsifier is expensive in comparison with the other constituents and performs no function in the wax coating after the emulsion has been applied and dried. The minimum amount of emulsifier required to make good, stable emulsions varies from about two to five percent of the total weight of the emulsion. However, good, stable emulsions can be produced with much higher amounts of emulsifiers even with more emulsifier than wax but without any special advantage.

The alkylphenol ethoxylate also called alkylphenol polyoxyethylene having at least 30 carbon atoms in the alkyl has the general formula:

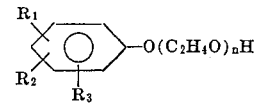

wherein $R_1$ is a straight chain or substantially straight chain alkyl group having between 30 and about 50 carbon atoms and $R_2$ and $R_3$ are independently selected from said alkyl group and hydrogen; and n is an integer ranging in value from about 10 to about 22; and mixtures of said compounds in which the average carbon number of said alkyl groups is between about 32 and about 45 and the ratio of alkyl groups to aromatic rings in the mixture is between about 1 and about 1.7.

These alkylphenol polyoxyethylenes are generally prepared by the alkylation of phenol followed by the ethoxylation of the resulting alkylphenol with ethylene oxide. If the phenol is alkylated with a pure alpha-olefin, the resulting product is a mixture of alkylphenols having from one to three alkyl substituents. Since this mixture is very difficult to separate into the individual alkylphenols and since the mixture possesses in general the same basic properties and uses as the individual components, the mixture is preferably used for the preparation of the final product. In the common methods for preparing the higher alpha-olefins, a mixture of alpha-olefins is obtained and used for the alkylation, further increasing the variety of compounds in the alkylphenol product. In the ethoxylation stage, the number of ethoxy groups which unite with individual alkylphenol molecules varies over a wide range in which $n$ of the general formula represents the average for the mixture. Therefore, the final product in the preferred method of its preparation, utilizing a mixture of alpha-olefins without product separation, is a mixture of a substantial number of isomers and analogs of congeneric compositions having the same origin, nature and action.

The alkylphenols from which the emulsifying agents used in the present invention are derived, can be prepared by reacting a higher alpha-olefin or a mixture thereof, for example, a $C_{30+}$ alpha-olefin fraction having an average carbon number of between about 32 and about 45 with a mixture of $BF_3$ or other Lewis acid catalyst such as hydrogen fluoride or aluminum chloride and phenol at a temperature of about 0° to about 150° C., preferably from about 60° to about 90° C., until substantially all of the alpha-olefin is reacted. The reaction time may vary from about 10 minutes to about five hours depending on the other reaction parameters, but as can be seen from the examples set out hereinbelow, a reaction time of about one-half to about three hours is generally suitable. The reaction pressure is relatively immaterial and may vary from considerably above to considerably below atmospheric pressure. However, substantially atmospheric pressure is preferred as being most convenient. The resulting reaction mixture will normally comprise mono- and probably, di- and/or tri- alkylphenols in admixture with the catalyst and unreacted phenol.

After alkylation of the phenol is substantially complete, the reaction mixture is treated with an alkaline agent, such as caustic soda or sodium carbonate, in sufficient quantities to neutralize the catalyst. Unreacted phenol is then removed from the neutralized mixture, for example, by steam distillation. The neutralized mixture of mono-, di- and tri- alkylphenols can then be treated with an alkali metal or oxide or hydroxide, such as sodium, or its oxide or hydroxide, in an inert atmosphere. In view of the high molecular weights of the mono-, di- and tri-alkylphenols, separation is too difficult to be practical, therefore, the mixture of compounds is used in the next step. The treated alkylphenol mixture is next polyethoxylated by a condensation reaction with ethylene oxide at a temperature of from about 100° C. to about 200° C., and preferably from about 150° C. to 180° C., until the average mol ratio of ethylene oxide to phenol in the resulting alkylphenol polyoxyethylene is from about 10 to about 22.

The following examples are presented for the purpose of further illustrating the present invention and are not to be regarded as limitive. Parts are all given by weight unless indicated otherwise.

EXAMPLE 1

A stirred glass reactor was charged with 446.4 grams (1 mol) of a $C_{30+}$ alpha-olefin, whose analysis is set forth below in Table I, over a period of about one-half hour to a mixture of 282 grams (3 mols) of phenol and 11.3 grams (0.17 mols) of $BF_3$ which had been allowed to stand for two hours. The temperature of the reaction mixture was maintained at about 90° C. by means of a steam bath for about 2 hours, whereafter 100 milliliters of water were added to the mixture. The $BF_3$ was then neutralized with $Na_2CO_3$ and excess phenol was removed by steam distillation and finally, by vacuum stripping. About 70 grams (0.74 mols) of phenol was consumed in this reaction.

TABLE I

| | |
|---|---|
| Appearance (D498) | Bright |
| Color, Saybolt (D156) | −16 |
| Congealing Point (D938): °F. | 155.6 |
| Melting Point (D127): °F. | 160.5 |
| Average Carbon Number | 31.9 |
| Average Molecular Weight | 446 |
| Penetration at 77° F. (D1321) | 13 |
| Viscosity, SUS (D2161): sec. at 210° F. | 53 |
| Viscosity, Kin. (D445): cs. at 210° F. | 8 |

ASTM test numbers are in parentheses.

EXAMPLE 2

In a series of experiments, $C_{30+}$ alkylphenol mixtures prepared in accordance with Example 1 were treated with Na metal at a temperature of about 120° C. accompanied with $N_2$ sparging. The Na was completely consumed in about one-half hour, whereafter the sparging was discontinued, the reaction mixture was heated to the reaction temperature and the addition of ethylene oxide to the reaction mixture was begun. Ethylene oxide was introduced into the reaction mixture during the reaction period, at substantially atmospheric pressure, whereafter the mixture was again sparged with $N_2$ and allowed to cool. The cooled alkylphenol ethoxylate product was a solid at room temperature and was a mixture having a structural formula which may be represented as follows:

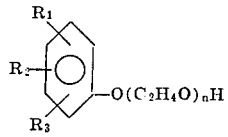

wherein $R_1$, $R_2$ and $R_3$ are a $C_{30+}$ alkyl group or hydrogen, at least one of said $R_1$, $R_2$ and $R_3$ being an alkyl group; an n is an integer indicating the average number of mols of ethylene oxide per mol of phenol in the alkylphenol ethoxylate. The data relating to the above series of experiments follow in Table II in which n represents the average number of mols of ethylene oxide in the alkylphenol ethoxylate product in accordance with the general formula.

TABLE II

ETHOXYLATION OF $C_{30+}$ ALKYLPHENOL

| A | B | C | Average reaction temp. °C. | Reaction time minutes | n |
|---|---|---|---|---|---|
| 53 | 0.3 | 77.9 | 168 | 160 | 18.7 |
| 108 | 0.4 | 142.6 | 190 | 170 | 16.2 |
| 53 | 0.2 | 45.0 | 180 | 75 | 10.2 |

A = alkylphenol in grams.
B = sodium metal in grams.
C = ethylene oxide in grams.

EXAMPLE 3

37.5 grams of an alkylphenol ethoxylate as produced in Examples 1 and 2 in which n of the general formula was 16.2 and 187.5 grams of a highly refined petroleum based paraffin wax having a melting point of 140° F. were melted together at 90° C. After a clear melt was obtained, 525 grams of boiling water were gradually added with mild stirring using a simple propeller-type stirrer. Upon completion of the addition of the boiling water a viscous emulsion resulted. Stirring was continued as the emulsion was cooled to room temperature. A sample of the emulsion was tested in a Brookfield viscometer and a viscosity of 1,660 c.p.s. at 73° F. was obtained. Upon reheating to 65° C. with mild stirring, the emulsion became less viscous and remained so upon cooling to room temperature. A sample of the reheated material was tested in the Brookfield viscometer and its viscosity was found to be 28 c.p.s. at 73° F. The proportions of the constituents were 70 parts of water, 25 parts of wax and five parts of emulsifier resulting in a 30 percent solids content.

EXAMPLE 4

In another experiment various combinations of an alkylphenol ethoxylate as produced in Examples 1 and 2 in which n was 18.7 and a highly refined petroleum based paraffin wax having a melting point of 133° F. were used in making wax-in-water emulsions. The before reheating and after reheating viscosities were determined in a Brookfield viscometer. The quantities of the constituents in weight percent and the results are set forth in Table III.

TABLE III

| Wax | Emulsifier | Total Solids | Viscosity, c.p.s. at 73° F. | | |
|---|---|---|---|---|---|
| | | | Water | Before reheating | After reheating |
| 41 | 9 | 50 | 50 | 64,000 | 390 |
| 15 | 5 | 20 | 80 | 700 | 20 |
| 10 | 5 | 15 | 85 | 20 | 15 |

EXAMPLE 5

An emulsion was made as described in Example 3 using 20 parts of a 30 carbon plus fraction of alpha-olefins, five parts of an alkylphenol ethoxylate as produced in Examples 1 and 2 in which n was 10.2 and 75 parts of water. The resulting emulsion was thick and creamy at room temperature. Upon reheating the emulsion to 80° C. a sharp decrease in viscosity was observed which was retained upon cooling to room temperature.

EXAMPLE 6

The experiment as carried out in Example 5 was repeated except that 25 parts of the alpha-olefin and 70 parts of water were used. The initial emulsion before reheating was thick and viscous at room temperature and after reheating to 80° C. was substantially more fluid and less viscous at room temperature.

EXAMPLE 7

The procedure of Example 6 was followed except that the alkylphenol ethoxylate had an n number of 16.2. Once again the room temperature viscosity of the emulsion was significantly reduced by reheating to 80° C. from a thick, creamy emulsion to a much more fluid emulsion.

As previously indicated, the initial emulsion is prepared at a temperature as high as or higher than the melting point of the constituents using gentle stirring to ensure a mixing of the constituents and an even temperature distribution. The temperature of the resulting emulsion is then lowered below the melting point of the wax-emulsifier phase and the stirring is continued to maintain the even temperature distribution. After the emulsion has been cooled throughout, it is reheated to the melting point of the wax-emulsifier phase or higher as stirring is continued. After the reheat temperature has been reached, the viscosity of the emulsion substantially lowers and this substantial reduction in viscosity remains as the emulsion is cooled to room temperature for immediate use, shipment or storage. This process is adapted for either batch or continuous preparation of emulsion.

It should be understood that the above examples are merely illustrative of the principles of the present invention and that various modifications may be made in the examples given without departing from the spirit and scope of the invention as defined in the following claims.

I claim:

1. A process for making a low viscosity at room temperature, stable, wax-in-water emulsion which comprises mixing between about 50 and 85 weight percent water and between about 15 and about 50 weight percent of a mixture of a paraffin or alpha-olefin wax and at least two weight percent based on the total composition of an alkylphenol ethoxylate emulsifier having the general formula

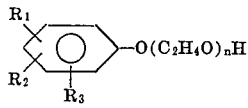

wherein n is an integer from about 10 to about 22, $R_1$ is a straight chain or substantially straight chain alkyl group having at least 30 carbon atoms, and $R_2$ and $R_3$ are independently selected from said alkyl group and hydrogen, and mixtures of said ethoxylates at a temperature of at least the melting point of the wax-emulsifier mixture whereby an emulsion is produced, cooling said emulsion below the melting point of the wax-emulsifier phase, and reheating said emulsion to a temperature of at least the melting point of the wax-emulsifier phase whereby the viscosity of said emulsion is substantially reduced.

2. A process in accordance with claim 1 in which the reheated emulsion is cooled to room temperature.

3. A process in accordance with claim 1 in which the wax is a paraffin wax having a melting point of about 120° to about 155° F.

4. A process in accordance with claim 1 in which the wax is an alpha-olefin having at least 30 carbon atoms or mixtures thereof.

5. A process in accordance with claim 1 in which the solids content of the emulsion is between about 30 and about 50 weight percent.

6. A process in accordance with claim 1 in which the emulsion is prepared at a temperature between about 80° and about 100° C.

7. A process in accordance with claim 1 in which the emulsion is reheated to a temperature between about 80° and about 100° C.

8. A process in accordance with claim 6 in which the emulsion is reheated to a temperature between about 80° and about 100° C.

9. A process in accordance with claim 1 in which said emulsifier comprises from about two to about five percent of the total composition.

10. A process in accordance with claim 1 in which said reheated emulsion is cooled to a temperature below the melting point of the wax-emulsifier phase.

* * * * *